3,086,914
LIP-COLORING COMPOSITIONS
Saul Soloway, New Rochelle, N.Y., assignor to Faberge, Inc., Ridgefield, N.J., a corporation of New York
No Drawing. Filed June 23, 1959, Ser. No. 822,196
7 Claims. (Cl. 167—85)

This invention relates to improved solutions of fluorescein and xanthene dyes and to the preparation of compositions for coloring or staining the lips, face or other parts of the body, particularly lipsticks, containing such improved solutions. More particularly, this invention relates to such compositions containing a solvent capable of dissolving the dye or staining composition to a much higher degree than heretofore possible.

It is a common practice in the preparation of cosmetics, as lip coloring compositions, to blend together a mixture of waxes, oils, dyestuffs, and lakes. Typical waxes which are in use include beeswax, carnauba wax, paraffin, ozokerite, ceresin, candelilla wax, spermaceti, and certain lanolin alcohols. Typical oils are castor oil, n-butyl stearate, mineral oil, petrolatum, isopropyl myristate, lanolin, and olive oil. These oils include substances which are normally greases at room temperature. The dyestuffs generally include one or more fluorescein or xanthene dyes, or other approved dyes, preferably the halogenated fluorescein dyes. The lakes consist of dyes on carriers such as alumina, titanium dioxide, clay, zinc oxide, etc. These components are generally present in the following proportions by weight:

|  | Percent |
|---|---|
| Waxes | 20–40 |
| Oils (including dye solvent) | 45–65 |
| Dyes | 2–5 |
| Lakes | 6–15 |

The waxes perform the function of giving body or stiffness to the cosmetic preparation, whereas the so-called oils perform the function of acting as the dispersing medium for the dyes and their solvents, as well as co-operating with the waxes to provide a vehicle for conveniently and smoothly applying the cosmetic to the desired areas. The function of the lakes is also to act as carriers for the desired dyes and to aid in producing the desired color.

In order to produce an acceptable lip coloring preparation, an improved dye having high indelibility must be incorporated into the usual fats and waxes under conditions such that the dye and its solvent are compatible with the other ingredients, and such that the preparation as a whole is non-toxic and non-irritating to the skin and does not have an undesirable taste.

As might be expected, the solvent for the dye occupies a position of great importance since it is known that the indelibility or staining power of the composition is a function of the solubility of the dye in the given solvent. Consequently, solvents which are compatible with the waxes and oils and yet capable of dissolving substantial amounts of dye have long been sought. Also, dye solvents which will enhance the indelibility of the dye have been under investigation.

Castor oil has heretofore been used as a solvent for halogenated fluorescein dyes. Although castor oil has many of the desired properties such as compatibility, low volatility, and at the same time is non-toxic and non-irritating, it is not considered a good solvent because it can form, at most, only about a one percent solution of the halogenated fluorescein dye, and dissolves much less of the alkali salts of the dye. Consequently, a cosmetic prepared with castor oil has low indelibility.

Other solvents which have been used heretofore are tetrahydrofurfuryl alcohol and esters thereof such as tetrahydrofurfuryl acetate, palmitate and stearate. Although these compounds are superior to castor oil in that they can form 15 to 20 percent solutions of a halogenated fluoroescein dye, they are considered undesirable in that they are somewhat volatile. In addition they tend to form peroxides which tend to cause the fats in the cosmetic preparation to become rancid. Furthermore, the tetrahydrofurfuryl compounds do not dissolve appreciable amounts of the sodium and potassium salts of the halogenated fluorescein dyes. This is considered a serious defect of the tetrahydrofurfuryl solvents because the sodium and potassium salts of these dyes produce the most brilliant colors. It must also be emphasized that some media, although good dye solvents per se, do not greatly increase the solubility in conjunction with additional fats, oils, and waxes. The latter substances are, of course, the principal constituents of lipsticks. In this connection, it has been discovered that the solvents of the present invention are superior to the solvents employed by the prior art.

Since the amount of dye usually incorporated into the cosmetic preparation is relatively small in comparison to the total weight, the ability of the solvent to dissolve the dye takes on added significance. For example, it is common in lipstick preparations to employ a dye concentration of about 2% by weight, but not more than 5%. The percent of dye solvent employed in combination with the oils and waxes depends on the desirable properties of the solvent over and above the oils and waxes used. For example, castor oil, having poor solvent properties has been incorporated up to about 65% because of its excellent compatibility with the waxes employed, low volatility, and good emollient characteristics. Tetrahydrofurfuryl compounds, however, have generally been incorporated only to about 15% because of their relatively high volatility, low viscosity, and tendency to produce rancidity. The tetrahydrofurfuryl compounds, although possessing relatively good dissolving characteristics, are not considered desirable solvents because they cannot be used in the final cosmetic preparation in concentrations sufficient to embody an amount of dye which has the proper indelibility or staining power.

Other solvents which have heretofore been considered and used, but which are deemed unsatisfactory because of their poor solvent power and other qualities, include polyethylene glycols and esters thereof, including propylene glycol monolaurate, various fats and hydrogenated vegetable oils, etc. None of these solvents embody all of the necessary or desirable characteristics with regard to the dyes deemed acceptable for use in cosmetic preparations for coloring the lips, face, or other areas of the body.

Accordingly, it is an object of this invention to provide dye solutions embodying a dye solvent which has a high degree of solvent power capable of forming solutions containing as much as 25% or higher of dissolved dye.

It is another object of this invention to provide a cosmetic composition embodying a dye solvent which imparts to the composition a high degree of indelibility.

It is still another object of this invention to provide a cosmetic composition embodying a dye solvent which has a high degree of dissolving power, which is compatible with the waxes and oils used in such compositions, and which does not impart an undesirable taste.

Other objects of the invention will be apparent from reading the present specification.

The dyes which are usually considered by the cosmetic industry to be suitable for use in cosmetic preparations, such as lipsticks, are the xanthene and fluoran classes of dyes. These include the fluorescein derivatives and those which are related triphenyl methane dyes. The fluorescein type dyes, particularly the halogenated fluoroesceins, are generally preferred because they possess greater indelibility. The dyes to which I will refer are certified color dyes and appear in the Food and Drug Administration's list of certified color dyes. Reference to the dyes will be made according to the official name given in the U.S. Food and Drug Administration lists as well as to the descriptive chemical name when applicable.

The classification fluoran type dyes includes the fluoresceins and halogenated fluoresceins and their alkali metal salts. The halogenated fluoresceins refer to compounds obtainable by the reaction of phthalic anhydride with a halogenated resorcinol derivative in the presence of an acid catalyst. Examples of such halogenated fluoresceins are: 4,5-dibromo-3,6-fluorandiol (D & C Orange No. 5); 2,4,5,7 - tetrabromo - 12,13,14,15 - tetrachloro - 3,6-fluorandiol (D & C Red No. 27); 4,5-dichloro-3,6-fluorandiol (D & C Orange No. 8); 2,4,5,7-tetrabromo-3,6-fluorandiol (D & C Red No. 21), etc., as well as the sodium and potassium and other alkali salts of the above. The fluoran type dyes are most often used in lipsticks because of their high indelibility or staining power.

The present invention is also applicable to the xanthene type dyes including the triphenyl methane type dyes. Examples of this latter group of dyes include the 3-ethochloride of 9-ortho-carboxyphenyl-6-diethylamino-3-ethylimino-3-isoxanthene (D & C Red No. 19) and its 3-ethoacetate (D & C Red No. 20); the disodium salt of 9-ortho-carboxyphenyl-6-hydroxy-4,5-diiodo-3-isoxanthone (D & C Orange No. 11); etc.

The dye solvents employed in the present invention possess the requisite solvent power as well as the additional properties of compatibility, low volatility, and high indelibility, non-toxicity. These solvents include certain lower amide compounds which I have found are particularly adapted to dissolve the alkali salts of the halogenated fluorescein dyes which heretofore could not be dissolved satisfactorily by such conventional solvents as castor oil and tetrahydrofurfuryl compounds. These solvents have a synergistic effect toward enhancing the indelibility of dyes on the skin.

A list of the solvents I have found suitable for the fluoran and xanthene type dyes most commonly used in cosmetic preparations is given below in Table I. Unless otherwise stated, the solubility of the dye in the named solvent was determined at 25° C. When a higher temperature is indicated, it is the elevated temperature required to increase the dye concentration in the given solvent to 5%.

TABLE I

| Dye Solvent | Dye | Solubility (25° C.) |
| --- | --- | --- |
| N-methyl acetamide | D & C Red No. 19 | at least 25%. |
|  | D & C Yellow No. 7 | 8%. |
|  | FD & C Blue No. 1 | 7%. |
| N, N-dimethyl acetamide | D & C Red No. 27 | 12%. |
|  | D & C Red No. 28 | 6%. |
| N-hydroxyethyl acetamide | D & C Red No. 21 | 5% (45° C.). |
|  | D & C Red No. 22 | 5% (80° C.). |

Other dyes which may be dissolved in the solvents of the present invention are:

FD & C Red No. 3 (erythrosine)
D & C Orange No. 6 (disodium dibromofluorescein)
D & C Orange No. 7 (potassium dibromofluorescein)
D & C Orange No. 8 (dichlorofluorescein)
D & C Orange No. 9 (disodium dichlorofluorescein)
D & C Orange No. 10 (diiodofluorescein)
D & C Orange No. 12 (erythrosine yellowish K)
D & C Orange No. 13 (erythrosine yellowish NH)
D & C Orange No. 14 (4,5,15-tribromo-2,7-dicarboxy-3,6-fluorandiol)
D & C. Orange No. 16 (dibromodiiodofluorescein)
D & C Red No. 20 (Rhodamine B-acetate)
D & C Red No. 23 (potassium salt of D & C Red No. 22)
D & C Red No. 24 (tetrachlorofluorescein)
D & C Red No. 25 (sodium tetrachlorofluorescein)
D & C Red No. 26 (potassium tetrachlorofluorescein)
D & C Yellow No. 8 (uranine)
D & C Yellow No. 9 (potassium salt of D & C Yellow No. 8)

To date the most suitable dye solvents of the invention are N-methyl acetamide, N-2-hydroxyethyl acetamide and N,N-dimethyl acetamide.

The dye solvents of the invention enhance the indelibility of the fluoran and xanthene dyes, whether the dye is dissolved in dilute or more concentrated solution. Most of these solvents have low taste levels. They are particularly satisfactory for dissolving the sodium and potassium salts of the dyes. These salts have been the most difficult to dissolve with the previously used solvents.

As stated hereinabove most lipsticks are composed of the following classes of materials in the following concentration ranges:

|  | Percent |
| --- | --- |
| Waxes | 20–40 |
| Oils (including dye solvent) | 45–65 |
| Dyes | 2–5 |
| Lakes | 6–15 |

Typical waxes, oils, dyes and lakes are those referred to hereinabove. In most lipsticks the ingredients are blended to provide a composition melting in the range of 55–70° C., and to have as much reflectivity as is possible, and to have other characteristics of esthetic value.

In order more clearly to disclose the nature of the present invention, the following examples illustrating lipsticks of the invention are disclosed. It should be understood, however, that this is done solely by way of example and is intended neither to delineate the scope of the invention nor limit the ambit of the appended claims. In the examples which follow, and throughout the specification, the quantities of materials are expressed in terms of parts by weight, unless otherwise specified.

*Example 1*

|  | Grs. |
| --- | --- |
| 20% solution of D & C Red No. 22 in N-methyl acetamide | 1.8 |
| Lauramide | 1.8 |
| Stearamide | 0.5 |
| Mineral oil | 1.3 |
| Carnauba wax | 0.5 |
| Vaseline (petroleum jelly) | 0.5 |
| Dytol B-35 (a mixture of aliphatic alcohols containing 12, 14 and 16 carbon atoms) | 0.5 |
| Lanolin | 0.5 |
| Spermaceti | 0.5 |
| 10% dispersion of mixed dyes and pigments in an oily base | 1.87 |

The solution of D & C Red No. 22 was first prepared by dissolving the dye in the N-methyl acetamide solvent until a 20% solution was obtained. This solution was added to a melted mixture of the carnauba wax, Vaseline, lauramide, stearamide, mineral oil, lanolin, spermaceti and Dytol B-35. The 10% dispersion of mixed dyes and pigments in an oil base (lake) was added to the resulting molten mixture, with agitation to provide the desired color. The molten mixture was finally poured into chilled lipstick molds.

*Example 2*

A lipstick preparation was prepared according to Example 1, except that a 5% solution of D & C Red No. 22 dissolved in N-hydroxyethyl acetamide was used instead of N-methyl acetamide.

As will be apparent to those skilled in the art, other of the dye solvents and other fluoran and xanthene dyes listed hereinabove may be employed to replace the dye solvents and dyes employed in the foregoing examples.

Although lipsticks have been particularly referred to for the purpose of illustrating the invention, it should be understood that they are only a preferred embodiment of the invention, which extends to other lip coloring or staining compositions, as well as to face covering compositions, including liquid compositions, creams and rouges intended for coloring and staining the lips, face or other parts of the body.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A lip-coloring composition containing waxes, oils, a dye selected from the class consisting of fluoran and xanthene dyes, and an amide solvent selected from the class consisting of N-methyl acetamide, N-2-hydroxyethyl acetamide and N,N-dimethyl acetamide.
2. A lip-coloring composition as defined by claim 1 wherein the dye is a fluorescein dye.
3. A lip-coloring composition as defined by claim 1 wherein the dye is a halogenated fluorescein dye.
4. A lip-coloring composition as defined by claim 1 wherein the dye is a triphenylmethane dye.
5. A lip-coloring composition as defined by claim 1 wherein the solvent is N-methyl acetamide.
6. A lip-coloring composition as defined by claim 1 wherein the solvent is N-2-hydroxyethyl acetamide.
7. A lip-coloring composition as defined by claim 1 wherein the solvent is N,N-dimethyl acetamide.

References Cited in the file of this patent

UNITED STATES PATENTS

| | | |
|---|---|---|
| 2,185,467 | Kritchevsky | Jan. 2, 1940 |
| 2,225,603 | Lubs | Dec. 17, 1940 |
| 2,225,604 | Lubs | Dec. 17, 1940 |
| 2,757,125 | Mudrak | July 31, 1956 |
| 2,888,313 | Mautner | May 26, 1959 |

FOREIGN PATENTS

| | | |
|---|---|---|
| 719,300 | Great Britain | Dec. 1, 1954 |

OTHER REFERENCES

Dimethyl Formamide, Product Information Bulletin, Du Pont, Wilmington, Del., pub 1949, pp. 1–5.